United States Patent [19]

Hook et al.

[11] E Re. 29,121

[45] Reissued Jan. 25, 1977

[54] STORAGE TANK AND RECLEANING APPARATUS FOR ROOT CROP HARVESTERS

[75] Inventors: Richard Wayne Hook, Des Moines; William Wayne Jackson, Bettendorf, both of Iowa

[73] Assignee: Deere & Company, Moline, Ill.

[22] Filed: Oct. 24, 1975

[21] Appl. No.: 625,544

Related U.S. Patent Documents

Reissue of:

[64] Patent No.: 3,809,164
Issued: May 7, 1974
Appl. No.: 361,934
Filed: May 21, 1973

[52] U.S. Cl. ..... 171/58; 56/345; 214/519

[51] Int. Cl.[2] ..... A01D 17/02

[58] Field of Search ..... 171/58, 138; 214/519–522, 42; 198/101; 56/345

[56] References Cited

UNITED STATES PATENTS

| | | | |
|---|---|---|---|
| 2,392,697 | 1/1946 | Russell et al. | 198/101 |
| 2,503,129 | 4/1958 | Pautz | 214/520 |
| 2,972,383 | 2/1961 | Erdman | 171/58 |
| 3,273,734 | 9/1966 | Schuler | 214/521 |
| 3,695,360 | 10/1972 | Hook et al. | 171/58 |
| 3,757,867 | 9/1973 | Hook et al. | 171/58 |

*Primary Examiner*—Russell R. Kinsey

[57] ABSTRACT

A root crop harvester having a horizontal cleaning conveyor for conveying harvested roots to one side of the machine while simultaneously removing excess dirt therefrom, and a vertical conveyor for receiving roots from the horizontal conveyor, elevating them and discharging them either into a receptacle alongside the harvester or into a storage tank mounted on the harvester frame. The storage tank has a transversely extending opening in its forward portion disposed directly above the cleaning conveyor, and a floor conveyor selectively operable to move roots lying on the floor forwardly to the opening so that they can gravitate there-through onto the cleaning conveyor to be recleaned.

14 Claims, 2 Drawing Figures

STORAGE TANK AND RECLEANING APPARATUS FOR ROOT CROP HARVESTERS

Matter enclosed in heavy brackets[ ] appears in the original patent but forms no part of this reissue specification; matter printed in italics indicates the additions made by reissue.

BACKGROUND OF THE INVENTION

The present invention relates generally to root crop harvesters and more particularly to a storage tank and recleaning apparatus for such harvesters.

A conventional root crop harvester such as a beet harvester or the like includes a plurality of digger wheel units for removing roots from the ground, a cleaning conveyor for simultaneously conveying the roots and removing excess dirt therefrom, and a vertical conveyor for elevating the cleaned roots so that they may be deposited into the box of a truck or other container moving alongside the harvester. Certain machines of this type include a tank attachment which consists of a temporary storage tank adapted for mounting on the frame of a harvester and a vertical conveyor in the tank for emptying the contents thereof into the container moving alongside the harvester. The addition of such a tank to the harvester permits the operator to continue harvesting during the time period in which a full container is removed from alongside the harvester and an empty container is moved into its place. Those beets which are harvested during this period are diverted into the tank, and when the empty container is in place alongside the harvester, those beets elevated by the primary vertical conveyor are once again discharged into the empty container and the beets which have accumulated in the tank are emptied into the container by means of the conveyor in the tank. Although a tank attachment of this type is effective to substantially reduce delay time during the harvesting operation, it is a relatively expensive attachment due primarily to the requirement for an additional conveyor to unload the roots deposited in the tank.

SUMMARY OF THE INVENTION

Accordingly, it is a primary object of the invention to provide a storage tank attachment for a root crop harvester, such as a beet harvester or the like, that is substantially less expensive to manufacture than tank attachments heretofore available. It is a further object to provide apparatus for recycling roots one or more times through the cleaning portion of the harvesting cycle. It is yet a further object of the invention to provide a tank attachment which utilizes the cleaning conveyor and vertical conveyor already on the machine for recleaning the harvested roots and elevating them from the tank to a discharge point. It is yet a further object to provide such apparatus that is simple in design and economical to manufacture.

In pursuance of these and other objects, the invention comprises a storage tank and recleaning apparatus for a root crop harvester, such as a beet harvester or the like, which comprises a tank mounted on the harvester frame for receiving roots discharged from the elevating conveyor on the harvester, and a conveyor on the floor of the tank for moving beets toward an opening formed in the floor directly above the cleaning conveyor. The tank is emptied by activating the floor conveyor which empties the contents of the tank through the opening in the floor and onto the cleaning conveyor. The roots then retrace their initial path across the cleaning conveyor, where additional cleaning takes place, and back up the vertical auger. They may then be redeposited in the tank so that they can again be recycled through the cleaning operation, or deposited instead in a container moving alongside the harvester. A baffle is provided at the opening in the floor of the tank to direct the roots being emptied from the tank onto the rear portion of the cleaning conveyor so that they offer minimum interference to the freshly dug beets being deposited onto the front portion of the conveyor.

By utilizing the existing conveying system on the harvester to elevate the roots from the tank, the expense of providing a separate vertical conveyor is eliminated and the only additional requirement is a relatively inexpensive floor conveyor in the tank. In addition, this arrangement permits the beets to be continually recycled through the cleaning portion of the harvesting operation so that additional dirt can be removed from the beets when harvesting conditions require such additional cleaning.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
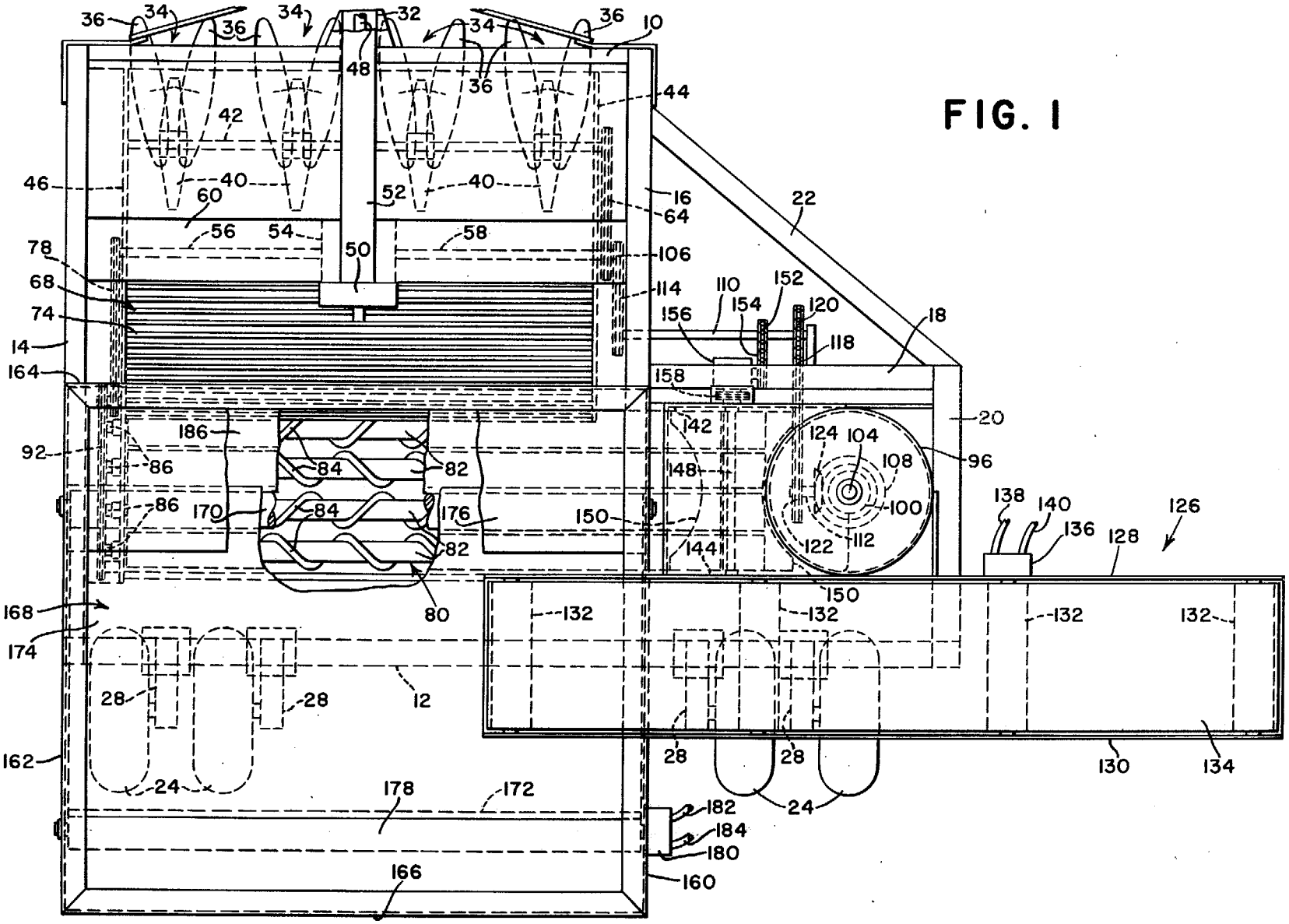
FIG. 1 is a plan view of a beet harvester incorporating the storage tank and recleaning apparatus of the invention.

Referring now to the drawings, the beet harvester illustrated is identical in several respects to that shown and described in copending U.S. applications Ser. No. 209,123 filed Dec. 17, 1971 now U.S. Pat. No. 3,695,360, and reference may be made to that application for additional detail of features not important for purposes of the present application. The beet harvester includes a main supporting framework composed of a front transverse frame member 10, a rear transverse frame member 12, a left longitudinal side frame member 14 which connects the left ends of the front and rear frame members and extends rearwardly from the latter, a first right longitudinal side frame member 16 which connects the right end of the front frame member with an intermediate portion of the rear frame member and extends rearwardly from the latter, a transverse frame member 18 which is connected to the member 16 and extends outwardly therefrom, a second right longitudinal side frame member 20 which connects the right ends of the frame members 18 and 12, and a diagonal brace member 22 which connects a forward portion of the member 16 with the front end of the member 20. The rear of the frame is supported by left and right pairs of ground-engaging wheels 24 mounted in a transversely adjustable manner on the rear transverse frame member 12. Each wheel 24 is rotatably supported on an axle 26 which extends outwardly from the lower end of a support member 28. Each member 28 is connected to the rear transverse frame member 12 by a pair of clamp assemblies 30 which are releasable to permit lateral adjustment of the member on the frame member 12 so that the wheels 24 may be positioned to accommodate various row spacings. The forward end of the main frame is supported by a hitch shown fragmentarily at 32 in the drawings, the hitch being adapted at its forward end for connection to the drawbar of a tractor and including means for adjusting its vertical position relative to the frame and thereby adjusting the height of the forward end of the frame relative to the ground.

Mounted on the front transverse frame member 10 and movable vertically therewith into and out of engagement with the ground are a plurality of transversely spaced digger wheel units 34, each unit comprising a cooperating pair of digger wheels 36 rotatably supported on opposite sides of a vertical standard 38 connected at its upper end to the front frame member 10 for relative lateral adjustment. The digger wheel units are adjustable relative to the frame member 10 to accommodate various row spacings. Associated with each digger wheel unit 34 is a paddle wheel 40 which extends between the upper rear portions of the wheels 36. The paddle wheels 40 are supported on a common transverse shaft 42 which is rotatably supported at opposite ends in vertical support plates 44 and 46 on the right and left sides, respectively, of the frame. The paddle wheels are mounted on the shaft 42 so that they can be adjusted laterally with their associated digger wheel units.

Figure 2:
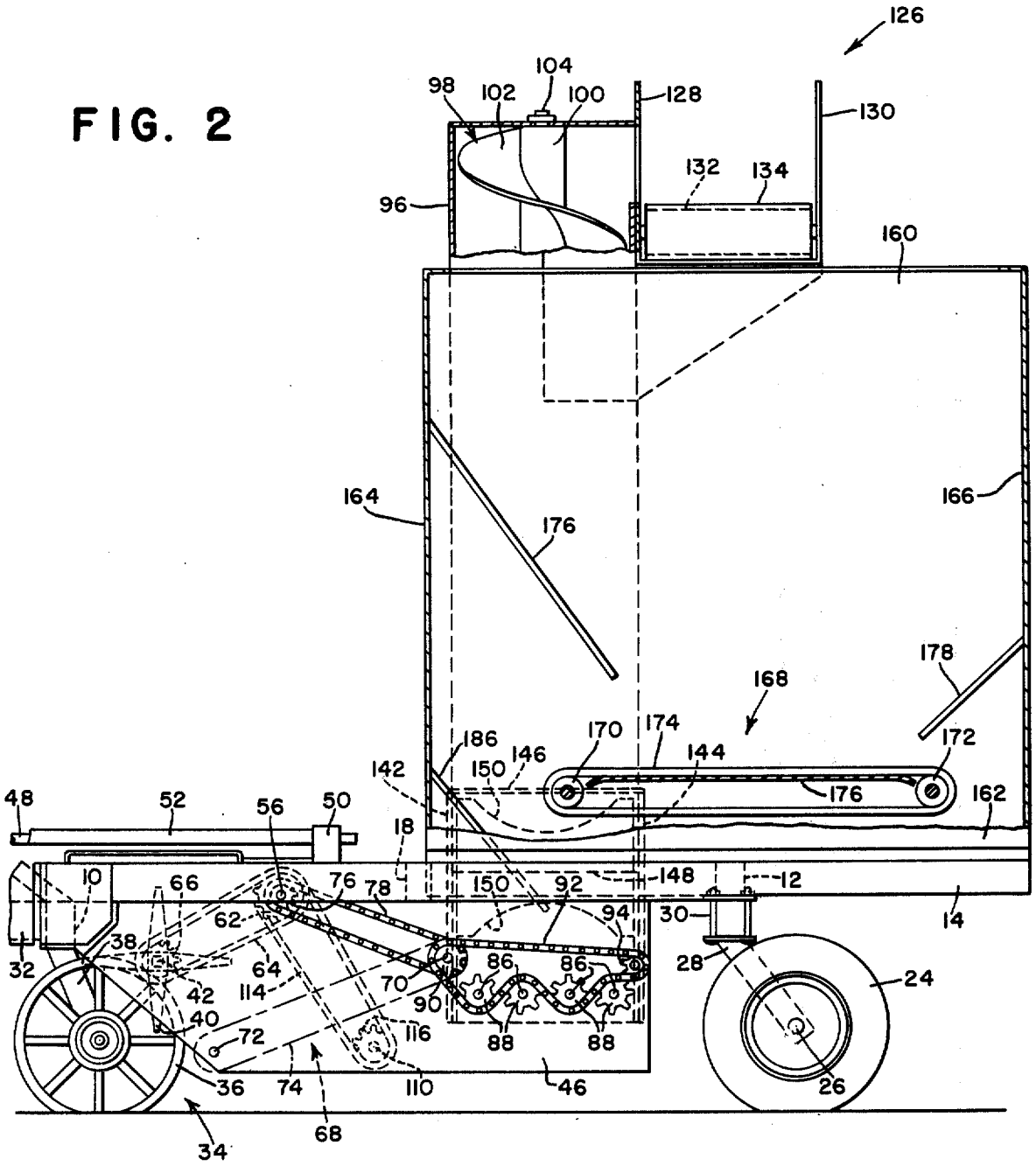
FIG. 2 is a left side elevational view of the harvester with portions removed for the sake of clarity.

The paddle wheels 40 are driven in a counterclockwise direction as viewed in FIG. 2 by the shaft 42 to engage and advance rearwardly beets removed from the ground by the digger wheels 36. Power is supplied for driving the shaft 42, as well as for driving the other operating components on the harvester which have not yet been described, from the power take-off shaft of the tractor. A longitudinal power shaft shown fragmentarily at 48 is adapted at its forward end for connection to the tractor power take-off shaft (not shown) and is supported at its rear end in a transfer box 50 which, in turn, is supported on the frame midway between the frame members 14 and 16. An inverted U-shaped shield 52 covers the shaft 48. A chain in the transfer box 50 transmits power from the rear end of the shaft 48 to the input shaft of a gearbox 54 which in turn drives a pair of shafts 56 and 58 extending transversely outwardly from the gearbox 54 and journaled at their outer ends in support plates 46 and 44, respectively. The gearing within the gearbox 54 is arranged so that the shafts 56 and 58 are driven in opposite directions, the shaft 56 being driven in a clockwise direction as viewed in FIG. 2 and the shaft 58 being driven in a counterclockwise direction when viewed in the same manner. The shafts 56 and 58 are covered by a shield 60 which extends transversely between the frame members 14 and 16 and serves also as a support for the gearbox 54. A sprocket 62 is mounted on the right end of the shaft 58 and is drivingly connected by means of a chain 64 with a sprocket 66 on the extreme outer end of the paddle wheel support shaft 42, to drive the latter and thereby the paddle wheels in a counterclockwise direction as viewed in FIG. 2.

In operation, the paddle wheels 40 are thus operative to engage beets which have been lifted from the ground by the digger wheels 36 and advance them rearwardly. The beets are delivered by the paddle wheels to a chain conveyor, designated generally by the numeral 68, which extends transversely between the support plates 44 and 46 and upwardly and rearwardly from a point directly behind the digger wheel units 34. The conveyor 68 includes upper and lower transverse shafts 70 and 72, respectively, which extend between and are journaled on the support plates 44 and 46. A plurality of sprockets are mounted on the shafts 70 and 72 and engage an endless conveyor chain 74 to drive the same in a clockwise direction as viewed in FIG. 2. Power is transmitted to the chain conveyor 68 from a sprocket 76 on the left end of the shaft 56 by means of a chain 78 which drivingly connects the sprocket 76 with a sprocket mounted on the left end of the upper conveyor shaft 70. In operation, the shaft 70 and thereby the conveyor chain 74 is driven by the shaft 56 in a clockwise direction as viewed in FIG. 2, and the chain conveyor 74 is thus operative to receive beets delivered rearwardly by the paddle wheels 40 and convey the same upwardly and rearwardly.

The beets conveyed rearwardly by the conveyor 68 are deposited on a second conveyor 80 which extends transversely across the machine. The conveyor 80 is composed of four conventional grab rolls 82, each of which includes a cylindrical tube with a spiral rod 84 secured to the outer surface thereof. Supported centrally within and extending through opposite ends of each roll 82 is a shaft 86, the left ends of the shafts 86 being rotatably supported by the plate 46 and the right ends thereof being rotatably supported in brackets (not shown) which are, in turn, supported by the frame members 12 and 18. A sprocket 88 is mounted on the extreme left end of each shaft 86, and each of the sprockets 88 is connected to a sprocket 90 on the extreme left end of the upper conveyor shaft 70 by a drive chain 92. As shown in FIG. 2, the chain 92, which additionally engages an idler sprocket 94 supported from the plate 46, is trained around the four sprockets 88 so as to drive alternate rolls in opposite direction. As the grab rolls are rotated, the spiral rods 84 act to advance the beets deposited on the conveyor transversely toward the right side of the machine. At the same time, dirt and other debris clinging to the beets is removed by the counterrotating action of the rolls and, is discharged downwardly therebetween to fall to the ground.

Beets conveyed toward the right side of the machine by the grab rolls 82 are delivered through an inlet opening in the bottom end of a vertically extending, cylindrical auger housing 96. The housing 96 is supported between the frame members 12 and 18 just inwardly of the frame member 20, and encloses a vertical auger conveyor 98. The auger 98 comprises a cylindrical core tube 100 having spiral flighting 102 secured to the outer surface thereof, and a shaft 104 contained centrally within the tube 100. The lower end of the shaft 104 is journaled in a bearing member on the floor of the housing 96, and the upper end of the shaft is rotatably supported in the top wall thereof.

The auger 98 is rotated to convey beets delivered through the inlet opening in the housing 96 upwardly through the housing by drive means which drivingly connect a sprocket 106 on the extreme right end of the shaft 58 with a bevel gear 108 on the lower end of the auger shaft 104. The drive means includes a first transverse shaft 110 which is supported from and extends beneath the longitudinal frame member 16, and a second transverse shaft 112 which is supported in a bracket on the underside of the auger housing floor. A first chain 114 drivingly connects the sprocket 106 on the shaft 58 with a sprocket 116 on the left end of the first transverse shaft 110, and a second chain 118 connects a sprocket 120 on the right end of the shaft 110 with a sprocket 122 on the left end of the second transverse shaft 112. A bevel gear 124 on the right end of the shaft 112 meshes with the bevel gear 108 on the lower end of the auger shaft to complete the drive connection.

Supported on the upper end of the housing 96 is a transverse conveyor designated generally by the numeral 126. The conveyor 126 includes a supporting framework having a pair of upright walls 128 and 130 and an endless belt-type conveyor disposed between the lower portions of the walls and including a plurality of rollers 132 extending between and journaled in the walls 128 and 130, and an endless flexible conveying element 134 drivingly trained around the rollers 132. Power is furnished for driving the conveyor 126 by a hydraulic motor 136 which drives one of the rollers 132. The hydraulic motor 136 is supplied with hydraulic fluid under pressure from a source on the tractor through hydraulic lines 138 and 140. In operation, beets conveyed upwardly by the vertical auger 98 are discharged rearwardly through an opening in the upper end of the housing 96 which communicates with an opening in the wall 128 of the transverse conveyor support, onto the upper run of the conveying element 134. The element 134 is operative to convey the beets transversely to the right end of the conveyor 126 where they are dropped into a suitable receptacle which may consist of a box on a truck driven alongside the harvester, or, by reversing the hydraulic motor 136, the beets may be conveyed by the element 134 to the left of the conveyor and dropped into the tank attachment of the invention which will subsequently be described.

A paddle wheel apparatus for assisting in feeding beets from the grab roll conveyor through the inlet opening in the lower end of the vertical auger housing 96 is provided at the juncture of these two elements. The apparatus comprises a housing formed by a pair of vertical walls 142 and 144 which extend transversely inwardly from the front and rear sides, respectively, of the auger housing 96, and a top wall 146 which connects the upper edges of the walls 142 and 144. A shaft 148 extends fore-and-aft between and is rotatably supported in the walls 142 and 144, the shaft having four equally circumferentially spaced resilient paddles 150 connected thereto and extending radially outwardly therefrom. Each paddle, as shown in the drawings, has an arcuate outer edge which passes in close proximity to the cylindrical wall of the housing 96 as the shaft 148 is rotated, the arcuate edge being concentric with the curvature of the housing wall when the edge is disposed at its minimum distance from the wall.

In operation, the shaft 148 is rotated so that the paddles move upwardly and toward the opening in the housing 96. The drive means for the paddle wheel apparatus comprises a sprocket 152 on the shaft 110 which is drivingly connected by means of a chain 154 to a sprocket on the input shaft of a gearbox 156. The gearbox 156 is supported on the underside of the frame member 18 and includes an output shaft having a sprocket thereon which is connected by means of a drive chain 158 to a sprocket on the forward end of the paddle wheel shaft 148. Additional detail of the paddle wheel apparatus is contained in copending U.S. application Ser. No. 361,935, filed May 21, 1973.

The tank and recleaning attachment of the invention is formed by four rectangular, vertical wall panels 160, 162, 164 and 166. The sidewalls 160 and 162 are supported along their lower edges by the frame members 16 and 14, respectively, and the front and rear walls 164 and 166 are connected to and extend between the fore-and-aft edges of the walls 160 and 162. As is apparent from FIG. 1 of the drawings, the tank is disposed on the frame so that its open upper end is directly below the inner discharge end of the transverse conveyor 126. Forming a bottom for the tank is a belt-type conveyor designated generally by the numeral 168, the conveyor comprising a pair of front and rear rollers 170 and 172, both of which extend transversely between and are rotatably supported in the lower ends of the sidewalls 160 and 162. An endless flexible belt 174 is drivingly trained around the rollers and includes an upper run which is supported by a rigid panel or floor 176. The floor 176 is connected to and extends transversely between the walls 160 and 162. The front wall structure of the tank attachment also includes a transverse member 176 which is supported between the sidewalls of the tank and slopes downwardly and rearwardly from an upper terminal edge disposed forwardly of the forwardmost extent of the conveyor 168, to a lower edge disposed above the conveyor 168 and rearwardly of its forwardmost extent. The rear wall structure of the tank further comprises a member 178 which extends transversely between the sidewalls and slopes downwardly and forwardly from the rear wall 166 to a lower edge disposed above the conveyor 168 and forwardly of its rearwardmost extent.

The rear roller 172 of the conveyor 168 may be driven in a counterclockwise direction as viewed in FIG. 2 by a hydraulic motor 180 which is mounted on the outer side of the wall 160. Fluid from the hydraulic system on the tractor is supplied to the motor through hoses shown fragmentarily at 182 and 184. When the roller 172 is driven, the upper run of the belt is advanced forwardly to deliver beets in the lower portion of the tank forwardly beneath the lower terminal edge of the member 176 to a discharge point located directly above the grab roll conveyor 80. As the beets gravitate from the forward end of the belt 174, they engage and are deflected rearwardly by a rearwardly sloping transverse baffle 186 which extends between the sidewalls of the tank. The purpose of the baffle 186 is to deposit the beets from the tank onto the rear portion of the grab roll conveyor 80, so that these beets will offer minimum interference to the freshly dug beets being deposited on the forward portion of th grab rolls by the conveyor 68.

During the principal portion of the harvesting operation, beets dug by the wheels 36 are deposited by the conveyor 68 onto the grab roll conveyor 80; they are then cleaned by the grab rolls while being conveyed to the inlet opening of the auger housing 96, elevated upwardly through the housing by the auger 98 and deposited on the conveyor 126, and finally conveyed outwardly by the conveyor 126 and dropped into a receptacle moving alongside the harvester. When the receptacle is full and must be removed to allow an empty receptacle to take its place, the harvesting operation can be continued by merely reversing the conveyor 126 so that the beets dug during the time it takes to move an empty receptacle into place are conveyed inwardly and deposited in the tank. When the empty receptacle is in place, the conveyor 126 is once again reversed to convey the beets outwardly and deposit them in the receptacle. The beets which have accumulated in the tank may then be emptied into the receptacle by activating the hydraulic motor 180 so that the beets in the tank are conveyed forwardly and deposited on the grab roll conveyor 80. Those beets are then once again cleaned by the grab rolls along with the freshly dug beets, conveyed transversely to the opening in the housing 96, elevated by the auger 98, and conveyed outwardly by the conveyor 126 to be deposited in the receptacle alongside the machine.

It will be appreciated, of course, that the apparatus of the invention can be employed primarily as a recleaning device, in which case the dug beets would all initially be deposited in the tank, and then recirculated across the grab roll conveyor to be recleaned before being deposited in the receptacle alongside the harvester.

We claim:

1. In combination with a root crop harvester having a mobile frame, means carried by the frame for removing roots from the ground and delivering them rearwardly, transverse cleaning conveyor means on the frame for receiving roots from the first-mentioned means and conveying them transversely to one side of the frame while simultaneously removing excess dirt therefrom, a vertically extending conveyor on said one side of the frame for receiving roots from the cleaning conveyor means and conveying the same vertically, and selectively operable means on the upper end of the vertical conveyor for directing roots elevated thereby either outwardly or inwardly relative to the frame, a root storage tank and recleaning apparatus comprising: a walled container mounted on the frame above the cleaning roll conveyor means and inwardly from the vertically extending conveyor, said container having an open top through which roots directed inwardly relative to the frame by the selectively operable means gravitate into the container, and a floor structure for the container having an opening through which roots conveyed thereto gravitate onto the cleaning conveyor, said floor having selectively operable conveyor means associated therewith for conveying roots in the container to said opening.

2. The invention defined in claim 1 wherein the opening in the floor of the container extends transversely directly above the cleaning conveyor means, and the conveyor means associated with the floor is operable to convey [the] roots to the opening in a generally even distribution along the transverse extent of the opening.

3. The invention defined in claim 1 wherein the container includes a pair of longitudinally extending vertical sidewalls, and wherein the conveyor means associated with the floor structure includes an endless flexible element which extends transversely between the sidewalls and has an upper run disposed above and supported on the floor structure and a lower run disposed below the floor structure.

4. The invention defined in claim 3 wherein the forwardmost extent of the endless flexible means defines the rear side of the opening in the floor structure.

5. The invention defined in claim 4 wherein the container includes a transverse front wall which has an upper edge disposed forwardly of the forwardmost extent of the endless flexible means and a lower edge disposed rearwardly of the forwardmost extent of the endless flexible means and in vertical spaced relation thereto.

6. The invention defined in claim 1 wherein the cleaning conveyor means has front and rear portions, the first-mentioned means is disposed to deliver roots to the front portion, and including means for directing roots which gravitate through the opening in the floor of the container onto the rear portion.

7. The invention defined in claim 6 wherein the conveyor means associated with the floor structure extends forwardly in overlying spaced relationship to the rear portion of the cleaning roll conveyor means and the forwardmost extent thereof defines the rear side of the opening in the floor structure, and wherein said root directing means includes a transversely extending baffle which is inclined downwardly and rearwardly to a lower transverse edge beneath the floor structure and above the cleaning roll conveyor means, and said baffle defines the front side of the opening in the floor structure.

8. A root crop harvester comprising: a mobile frame, means carried by the frame for removing roots from the ground, cleaning conveyor means disposed on the frame for receiving roots from the first-mentioned means and operative to convey said roots generally horizontally while simultaneously removing excess dirt therefrom, a vertical conveyor disposed on the frame for receiving roots from the discharge end of the cleaning conveyor means and operative to elevate the same, means on the upper end of the vertical conveyor for selectively directing the elevated beets to either of a pair of spaced discharge points, and a container mounted on the frame directly beneath one of said discharge points for receiving the elevated beets, the container having an opening in its lower portion and a conveyor associated with the floor of the container operative to move roots lying on the floor to the opening, the opening being located so that roots conveyed thereto are directed onto the cleaning conveyor means.

9. A beet harvester comprising: a mobile frame, a plurality of transversely spaced digger wheel units carried by the forward portion of the frame and operative to remove beets from the ground; a first, transversely extending conveyor supported on the frame directly behind the digger wheel units and operative to receive beets from each of the units and convey the same upwardly and rearwardly; a cleaning conveyor mounted on the frame directly behind the first conveyor and operative to receive beets from the first conveyor and convey the same transversely to one side of the machine, while simultaneously removing excess dirt therefrom, said cleaning conveyor including a plurality of parallel, cylindrical grab rolls having spiral ridges thereon; a vertical auger mounted at said one side of the machine and operative to receive beets from the cleaning conveyor and elevate the same; a transversely extending, reversible conveyor supported at the upper end of the vertical conveyor and operative to receive the elevated beets and convey them either inwardly to a first discharge point located over the frame or outwardly to a second discharge point located outwardly from the frame; a beet storage tank mounted on the frame directly beneath the first discharge point for receiving beets from the reversible conveyor, said tank having a transversely extending opening in its lower forward portion disposed directly above the cleaning conveyor; and a conveyor associated with the floor of the tank selectively operative to move beets lying on the floor forwardly to the opening to gravitate therethrough onto the cleaning conveyor.

10. The invention defined in claim 9 including a baffle in the tank for engaging the beets which gravitate through the opening and deflecting them rearwardly toward the rear portion of the cleaning conveyor.

*11. In combination with a root crop harvester having a mobile frame, means carried by the frame for removing roots from the ground and delivering them rearwardly, transverse cleaning conveyor means on the frame for receiving roots from the first-mentioned means and conveying them transversely to one side of the frame while simultaneously removing excess dirt therefrom, a vertically extending conveyor on said one side of the frame for receiving roots from the cleaning conveyor means and conveying the same vertically, and selectively operable means supported in a root receiving relation at the upper portion of the vertical conveyor for directing roots elevated thereby either outwardly or inwardly relative to the frame, a root storage tank and recleaning apparatus comprising: a walled container mounted on the frame above the cleaning roll conveyor means and inwardly from the vertically extending conveyor, said container having an open top through which roots directed inwardly relative to the frame by the selectively operable means gravitate into the container, and a floor structure for the container having an opening through which roots conveyed thereto gravitate onto the cleaning conveyor, said floor having selectively operable conveyor means associated therewith for conveying roots in the container to said opening.*

*12. A root crop harvester comprising: a mobile frame, means carried by the frame for removing roots from the ground, cleaning conveyor means disposed on the frame for receiving roots from the first-mentioned means and operative to convey said roots generally horizontally while simultaneously removing excess dirt therefrom, a vertical conveyor disposed on the frame for receiving roots from the discharge end of the cleaning conveyor means and operative to elevate the same, means supported in a root receiving relation at the upper portion of the vertical conveyor for selectively directing the elevated beets to either of a pair of spaced discharge points, and a container mounted on the frame directly beneath one of said discharge points for receiving the elevated beets, the container having an opening in its lower portion and a conveyor associated with the floor of the container operative to move roots lying on the floor to the opening, the opening being located so that roots conveyed thereto are directed onto the cleaning conveyor means.*

*13. In combination with a root crop harvester having a mobile frame, means carried by the frame for removing roots from the ground and delivering them rearwardly, transverse cleaning conveyor means on the frame for receiving roots from the first-mentioned means and conveying them transversely to one side of the frame while simultaneously removing excess dirt therefrom, conveyor means for elevating roots carried on the frame for receiving roots from the cleaning conveyor means and conveying the same upwardly, and selectively operable means disposed in root receiving relationship to said elevating conveyor means for directing roots elevated thereby either outwardly or inwardly relative to the frame, a root storage tank and recleaning apparatus comprising: a walled container mounted on the frame above the cleaning roll conveyor means and inwardly from the elevating conveyor means, said container having an open top through which roots directed inwardly relative to the frame by the selectively operable means gravitate into the container, and a floor structure for the container having an opening through which roots conveyed thereto gravitate into the cleaning conveyor, said floor having selectively operable conveyor means associated therewith for conveying roots in the container to said opening.*

*14. A root crop harvester comprising: a mobile frame, means carried by the frame for removing roots from the ground, cleaning conveyor means disposed on the frame for receiving roots from the first-mentioned means and operative to convey said roots generally horizontally while simultaneously removing excess dirt therefrom, conveyor means for elevating roots disposed on the frame for receiving roots from the discharge end of the cleaning conveyor means and operative to elevate the same, means disposed in root receiving relationship to said elevating conveyor means for selectively directing the elevated roots to either of a pair of spaced discharge points, and a container mounted on the frame directly beneath one of said discharge points for receiving the elevated roots, the container having an opening in its lower portion and a conveyor associated with the floor of the container operative to move roots lying on the floor to the opening, the opening being located so that roots conveyed thereto are directed onto the cleaning conveyor means.*

* * * * *